United States Patent
Wang

(10) Patent No.: US 9,632,885 B2
(45) Date of Patent: Apr. 25, 2017

(54) FAULT DETECTION METHOD AND RELATED DEVICE AND STACK SYSTEM

(71) Applicant: Huawei Technologies Co., Ltd., Shenzhen (CN)

(72) Inventor: Jing Wang, Nanjing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 202 days.

(21) Appl. No.: 14/720,253

(22) Filed: May 22, 2015

(65) Prior Publication Data

US 2015/0254147 A1    Sep. 10, 2015

Related U.S. Application Data

(63) Continuation of application No. PCT/CN2013/087656, filed on Nov. 22, 2013.

(30) Foreign Application Priority Data

Nov. 23, 2012 (CN) .......................... 2012 1 0482460

(51) Int. Cl.
*G06F 11/00* (2006.01)
*G06F 11/20* (2006.01)
(Continued)

(52) U.S. Cl.
CPC ...... *G06F 11/2007* (2013.01); *H04L 41/0681* (2013.01); *H04L 43/065* (2013.01)

(58) Field of Classification Search
USPC ................... 714/4.1, 4.2, 25, 2, 48
See application file for complete search history.

(56) References Cited

U.S. PATENT DOCUMENTS 7,085,958 B2* 8/2006 El-Batal ............... G11C 29/022
                                                        714/6.13
7,321,981 B1* 1/2008 Muntz ................. G06F 11/2007
                                                        370/216
(Continued)

FOREIGN PATENT DOCUMENTS

CN    101247275 A    8/2008
CN    101610182 A    12/2009
(Continued)

OTHER PUBLICATIONS

Foreign Communication From a Counterpart Application, European Application No. 13856267.3, European Office Action dated Aug. 29, 2016, 6 pages.
(Continued)

*Primary Examiner* — Sarai Butler
(74) *Attorney, Agent, or Firm* — Conley Rose, P.C.

(57) ABSTRACT

A fault detection method and a related device and stack system. The fault detection method is applied in a stack system, where a first communications device includes a first service board and a second service board, the first service board includes a first processor and a first component, the second service board includes a second processor and a second component, where the second component receives a first signal from the first component, updates the current total number of abnormal ports of the second communications device based on the number, which is indicated by the first signal, of abnormal ports of the second communications device, and if the updated current total number of abnormal ports of the second communications device satisfies a failure confirmation condition corresponding to the second communications device, informs the second processor that the second communications device partially or entirely fails.

15 Claims, 8 Drawing Sheets

(51) Int. Cl.
*H04L 12/24* (2006.01)
*H04L 12/26* (2006.01)

(56) References Cited

U.S. PATENT DOCUMENTS

| | | | |
|---|---|---|---|
| 8,098,571 B2 * | 1/2012 | Santoso | ............... H04L 45/00 370/216 |
| 2006/0062141 A1 | 3/2006 | Oran | |
| 2010/0329111 A1 | 12/2010 | Wan et al. | |
| 2011/0238818 A1 | 9/2011 | Wang et al. | |
| 2011/0320881 A1 | 12/2011 | Dodson et al. | |

FOREIGN PATENT DOCUMENTS

| | | | |
|---|---|---|---|
| CN | 102164056 A | 8/2011 | |
| CN | 102255751 A | 11/2011 | |

OTHER PUBLICATIONS

Partial English Translation and Abstract of Chinese Patent Application No. CN101247275, Part 1, Nov. 15, 2015, 8 pages.
Partial English Translation and Abstract of Chinese Patent Application No. CN101247275, Part 2, Nov. 15, 2015, 3 pages.
Foreign Communication From a Counterpart Application, European Application No. 13856267.3, Extended European Search Report dated Oct. 28, 2015, 8 pages.
Foreign Communication From a Counterpart Application, PCT Application No. PCT/CN2013/087656, English Translation of International Search Report dated Feb. 27, 2014, 2 pages.
Foreign Communication From a Counterpart Application, PCT Application No. PCT/CN2013/087656, English Translation of Written Opinion dated Feb. 27, 2014, 5 pages.

* cited by examiner

201 — A second component receives a first signal from a first component, where a first communications device includes a first service board and a second service board, the first service board may include a first processor and the first component, the second service board may include a second processor and the second component, the first processor and the second processor are used for service processing, and the first communications device and a second communications device are interconnected by using M ports 202 — The second component updates the current total number of abnormal ports of the second communications device based on the number, which is indicated by the first signal, of abnormal ports of the second communications device 203 — If the updated current total number of abnormal ports of the second communications device satisfies a failure confirmation condition corresponding to the second communications device, the second component may inform the second processor that the second communications device partially or entirely fails

FIG. 2

FAULT DETECTION METHOD AND RELATED DEVICE AND STACK SYSTEM

CROSS-REFERENCE TO RELATED APPLICATION

This application is a continuation of International Application No. PCT/CN2013/087656, filed on Nov. 22, 2013, which claims priority to Chinese Patent Application No. 201210482460.3, filed on Nov. 23, 2012, both of which are hereby incorporated by reference in their entireties.

TECHNICAL FIELD

The application relates to the field of communications technologies, and in particular, to a fault detection method and a related device and stack system.

BACKGROUND

Currently, stack technologies (including stack and cluster technologies and the like) are widely applied in data communications devices. In most stack technologies, multiple data communications devices are connected using a data channel such as an Ethernet or a high speed Ethernet data channel to form a stack system. In a stack system established using data channels, there may be merely a data channel between each data communications device and its adjacent data communications device. A data communications device generally includes at least one service board, and each service board includes at least one processor used for service processing.

A communications device generally needs to find a fault itself by means of detection when its adjacent communications device partially or entirely fails, so as to perform corresponding emergency handling in time. Generally, a processor used for service processing in the communications device directly monitors port state of each data channel, and the processor determines, according to a monitoring result, whether the adjacent communications device partially or entirely fails. It is found by practice that an existing mechanism for monitoring whether an adjacent communications device partially or entirely fails generally requires a long time and has low reliability, and therefore cannot satisfy the need of quick troubleshooting.

SUMMARY

Embodiments of the present invention provide a fault detection method and a related device and stack system, so as to improve efficiency and reliability of fault detection.

A first aspect provides a fault detection method, applied in a stack system, where the stack system includes a first communications device and a second communications device, where the first communications device includes a first service board and a second service board, the first service board includes a first processor and a first component, and the second service board includes a second processor and a second component, where the first processor and the second processor are used for service processing, the first communications device and the second communications device are interconnected using M ports, the first component includes a processor and/or a programmable logic device, and the second component includes a processor and/or a programmable logic device; and the fault detection method includes: receiving, by the second component, a first signal from the first component, updating the current total number of abnormal ports of the second communications device based on the number, which is indicated by the first signal, of abnormal ports of the second communications device, and informing, if the updated current total number of abnormal ports of the second communications device satisfies a failure confirmation condition corresponding to the second communications device, the second processor that the second communications device partially or entirely fails, where the first signal is sent by the first component after the first component receives a port abnormality interrupt signal initiated by N1 ports of the first service board, the first signal indicates that N1 ports of the second communications device are abnormal, and the N1 ports are a part or all of ports in the M ports.

With reference to the first aspect, in a first possible implementation manner, the first communications device further includes a third service board, and the third service board includes a third processor and a third component, where the third processor is used for service processing, and the third component includes a processor and/or a programmable logic device; and the method further includes: receiving, by the second component, a second signal from the third component, updating the current total number of abnormal ports of the second communications device based on the number, which is indicated by the second signal, of abnormal ports of the second communications device, and informing, if the updated current total number of abnormal ports of the second communications device satisfies the failure confirmation condition corresponding to the second communications device, the second processor that the second communications device partially or entirely fails, where the second signal is sent by the third component after the third component receives a port abnormality interrupt signal initiated by N2 ports of the third service board, the second signal indicates that N2 ports of the second communications device are abnormal, and the N2 ports are some ports in the M ports.

With reference to the first aspect or the first possible implementation manner of the first aspect, in a second possible implementation manner, the method further includes: receiving, by the second component, a port abnormality interrupt signal initiated by N3 ports of the second service board, where the N3 ports are some ports in the M ports, updating the current total number of abnormal ports of the second communications device based on N3, and informing, if the updated current total number of abnormal ports of the second communications device satisfies the failure confirmation condition corresponding to the second communications device, the second processor that the second communications device partially or entirely fails.

With reference to the first aspect or the first possible implementation manner of the first aspect or the second possible implementation manner of the first aspect, in a third possible implementation manner, the informing, if the updated current total number of abnormal ports of the second communications device satisfies a failure confirmation condition corresponding to the second communications device, the second processor that the second communications device partially or entirely fails includes: if the updated current total number of abnormal ports of the second communications device is equal to M, informing the second processor that the second communications device entirely fails; or if the updated current total number of abnormal ports of the second communications device is greater than or equal to M−X1, informing the second processor that the second communications device partially or entirely fails, where X1 is less than M; or if the updated current total number of abnormal ports of the second communications device is greater than or equal to X2%*M, informing the second processor that the second communications device partially or entirely fails, where X2 is greater than 0 and is less than or equal to 100.

With reference to the first aspect or the first possible implementation manner of the first aspect or the second possible implementation manner of the first aspect or the third possible implementation manner of the first aspect, in a fourth possible implementation manner, the stack system further includes a third communications device, where the first communications device and the third communications device are interconnected using Y ports; and the fault detection method further includes: receiving, by the second component, a fourth signal from the first component, updating the current total number of abnormal ports of the third communications device based on the number, which is indicated by the fourth signal, of abnormal ports of the third communications device, and if the updated current total number of abnormal ports of the third communications device satisfies a failure confirmation condition corresponding to the third communications device, informing the second processor that the third communications device partially or entirely fails, where the fourth signal is sent by the first component after the first component receives a port abnormality interrupt signal initiated by W1 ports of the first service board, the fourth signal indicates that W1 ports of the third communications device are abnormal, and the W1 ports are a part or all of ports in the Y ports.

A second aspect provides a communications device, where the communications device is interconnected with a second communications device using M ports, where the communications device includes a first service board and a second service board, the first service board includes a first processor and a first component, the second service board includes a second processor and a second component, the first processor and the second processor are used for service processing, the first component includes a processor and/or a programmable logic device, and the second component includes a processor and/or a programmable logic device; and the second component is configured to receive a first signal from the first component, update the current total number of abnormal ports of the second communications device based on the number, which is indicated by the first signal, of abnormal ports of the second communications device, and if the updated current total number of abnormal ports of the second communications device satisfies a failure confirmation condition corresponding to the second communications device, inform the second processor that the second communications device partially or entirely fails, where the first signal is sent by the first component after the first component receives a port abnormality interrupt signal initiated by N1 ports of the first service board, the first signal indicates that N1 ports of the second communications device are abnormal, and the N1 ports are a part or all of ports in the M ports.

With reference to the second aspect, in a first possible implementation manner, the communications device further includes a third service board, and the third service board includes a third processor and a third component, where the third processor is used for service processing, and the third component includes a processor and/or a programmable logic device; and the second component is further configured to receive a second signal from the third component, update the current total number of abnormal ports of the second communications device based on the number, which is indicated by the second signal, of abnormal ports of the second communications device, and if the updated current total number of abnormal ports of the second communications device satisfies the failure confirmation condition corresponding to the second communications device, inform the second processor that the second communications device partially or entirely fails, where the second signal is sent by the third component after the third component receives a port abnormality interrupt signal initiated by N2 ports of the third service board, the second signal indicates that N2 ports of the second communications device are abnormal, and the N2 ports are some ports in the M ports.

With reference to the second aspect or the first possible implementation manner of the second aspect, in a second possible implementation manner, the second component is further configured to receive a port abnormality interrupt signal initiated by N3 ports of the second service board, where the N3 ports are some ports in the M ports, update the current total number of abnormal ports of the second communications device based on N3, and if the updated current total number of abnormal ports of the second communications device satisfies the failure confirmation condition corresponding to the second communications device, inform the second processor that the second communications device partially or entirely fails.

With reference to the second aspect or the first possible implementation manner of the second aspect or the second possible implementation manner of the second aspect, in a third possible implementation manner, the communications device is further interconnected with a third communications device using Y ports; and the second component is further configured to receive a fourth signal from the first component, update the current total number of abnormal ports of the third communications device based on the number, which is indicated by the fourth signal, of abnormal ports of the third communications device, and if the updated current total number of abnormal ports of the third communications device satisfies a failure confirmation condition corresponding to the third communications device, inform the second processor that the third communications device partially or entirely fails, where the fourth signal is sent by the first component after the first component receives a port abnormality interrupt signal initiated by W1 ports of the first service board, the fourth signal indicates that W1 ports of the third communications device are abnormal, and the W1 ports are a part or all of ports in the Y ports.

A third aspect provides a stack system, where the stack system includes multiple interconnected communications devices, where at least one of the multiple communications devices is the communications device provided by the foregoing embodiment.

As can be seen from the foregoing, in this embodiment, a component (for example, a first component and a second component) used for fault detection is additionally disposed on a service board in a communications device in a stack system, where the component may include a processor and/or a programmable logic device. Port fault detection is performed using the dedicated component, for example, when receiving a first signal from the first component, the second component updates the current total number of abnormal ports of a second communications device based on the number, which is indicated by the first signal, of abnormal ports of the second communications device; and if the updated current total number of abnormal ports of the second communications device satisfies a failure confirmation condition corresponding to the second communications device, the second component may inform a second processor that the second communications device partially or entirely fails. Because fault detection and normal service processing work of the service board are separated, capability of a processor (for example, a first processor and the second processor) responsible for service processing on the service board is released, and fault detection is performed using the dedicated component, which helps improve efficiency and reliability of fault detection.

BRIEF DESCRIPTION OF DRAWINGS

To describe the technical solutions in the embodiments of the present invention more clearly, the following briefly introduces the accompanying drawings required for describing the embodiments. The accompanying drawings in the following description show some embodiments of the present invention, and a person of ordinary skill in the art may still derive other drawings from these accompanying drawings without creative efforts.

FIG. 2 is a schematic flowchart of a fault detection method according to an embodiment of the present invention;

DESCRIPTION OF EMBODIMENTS

Figure 1A:
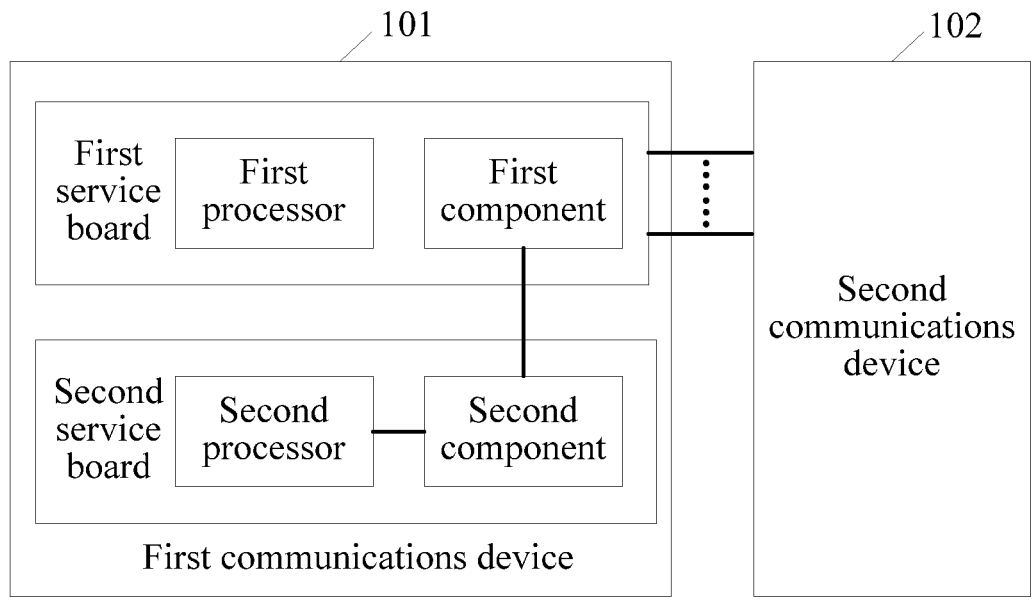
FIG. 1A is a schematic architecture diagram of a stack system according to an embodiment of the present invention.

Embodiments of the present invention provide a fault detection method and a related device and stack system, so as to improve efficiency and reliability of fault detection.

To make the solutions in the present invention more comprehensible for a person skilled in the art, the following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

The embodiments are separately described in detail in the following.

Terms such as "first", "second", "third", and "fourth" (if they exist) in the specification, claims, and foregoing accompanying drawings of the present invention are used to distinguish between similar objects, and are not necessarily used to describe a specific sequence or order. It should be understood that the used data is interchangeable under appropriate circumstances, so that the embodiments of the present invention described herein can, for example, be implemented in sequences other than the sequences illustrated or described herein. In addition, the terms "include" and "have" and any variations thereof are intended to be non-exclusive. For example, a process, a method, a system, a product, or a device that includes a series of steps or units is not necessarily limited to explicitly listed steps or units, but may include other steps or units that are not explicitly listed or that are inherent to such process, method, product, or device.

An embodiment of the present invention provides a fault detection method, where the fault detection method may be applied in a stack system, the stack system may include a first communications device and a second communications device, where the first communications device may include a first service board and a second service board, the first service board may include a first processor and a first component, and the second service board may include a second processor and a second component, where the first processor and the second processor are used for service processing, the first communications device and the second communications device are interconnected using M ports, the first component includes a processor and/or a programmable logic device, and the second component includes a processor and/or a programmable logic device. The fault detection method includes: receiving, by the second component, a first signal from the first component, updating the current total number of abnormal ports of the second communications device based on a number, which is indicated by the first signal, of abnormal ports of the second communications device, and if the updated current total number of abnormal ports of the second communications device satisfies a failure confirmation condition corresponding to the second communications device, informing the second processor that the second communications device partially or entirely fails, where the first signal is sent by the first component after the first component receives a port abnormality interrupt signal initiated by N1 ports of the first service board, the first signal indicates that N1 ports of the second communications device are abnormal, and the N1 ports are some or all of ports in the M ports.

First, referring to FIG. 1A and FIG. 2, FIG. 1A is a schematic architecture diagram of a stack system according to an embodiment of the present invention, and FIG. 2 is a schematic flowchart of a fault detection method according to an embodiment of the present invention. The stack system shown in FIG. 1A includes a first communications device 101 and a second communications device 102, where the first communications device 101 may include a first service board and a second service board, the first service board may include a first processor and a first component, and the second service board may include a second processor and a second component; the first processor and the second processor are used for service processing; the first communications device and the second communications device are interconnected using M ports; and the first component includes a processor and/or a programmable logic device, and the second component includes a processor and/or a programmable logic device.

As shown in FIG. 2, a fault detection method provided by an embodiment of the present invention may be applied in the stack system with the architecture shown in FIG. 1A or may be applied in a similar stack system that has been varied or extended. The method may specifically include the following content:

201: The second component receives a first signal from the first component.

The first signal (the first signal may be, for example, an interrupt signal or another type of signal) may be sent by the first component after the first component receives a port abnormality interrupt signal initiated by N1 ports of the first service board, and the first signal may indicate that N1 ports of the second communications device are abnormal. If the first communications device and the second communications device are interconnected using M ports, the N1 ports may be a part or all of ports in the M ports.

In some embodiments of the present invention, there may be N1 interconnect ports between the first service board and the second communications device, or there may be more than N1 interconnect ports between the first service board and the second communications device. Further, different port group numbers may be allocated to interconnect ports between different communications devices or different service boards, so that interconnection situations of different ports are distinguished from each other according to the port group numbers.

202: The second component updates the current total number of abnormal ports of the second communications device based on the number, which is indicated by the first signal, of abnormal ports of the second communications device.

In some embodiments of the present invention, for example, an initial value of the current total number of abnormal ports of the second communications device may be set to 0. After receiving, for the first time, a signal (for example, the first signal) used for indicating the number of abnormal ports of the second communications device, the second component may accumulate the number, which is indicated by the received signal, of abnormal ports of the second communications device to the initial value, to obtain the total number of abnormal ports of the second communications device at this time. Subsequently, each time the second component receives a signal used for indicating the number of abnormal ports of the second communications device, the second component may accumulate the number, which is indicated by the received signal, of abnormal ports of the second communications device to the latest current total number, which is obtained, of abnormal ports of the second communications device, thereby implementing update of the current total number of abnormal ports of the second communications device.

203: If the updated current total number of abnormal ports of the second communications device satisfies a failure confirmation condition corresponding to the second communications device, the second component may inform the second processor that the second communications device partially or entirely fails.

In some embodiments of the present invention, the second component may send an interrupt signal or another signal to the second processor, so as to inform the second processor that the second communications device partially or entirely fails. If the second processor learns that the second communications device partially or entirely fails, the second processor may perform emergency troubleshooting related to the second communications device. For example, the second processor may perform a corresponding operation such as service backup or fault alarm issuing.

In some embodiments of the present invention, the second service board may be an ordinary service board, or may be a control board in the communications device.

Figure 1B:
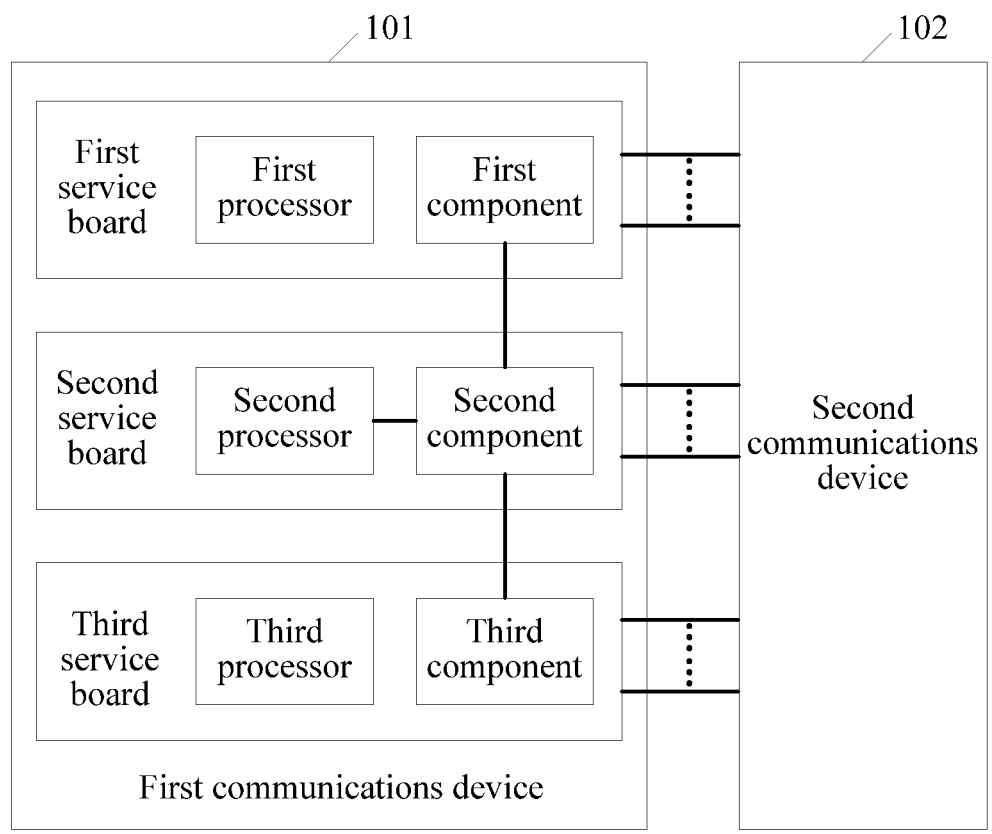
FIG. 1B is a schematic architecture diagram of another stack system according to an embodiment of the present invention.

For example, as shown in FIG. 1B, in some embodiments of the present invention, if the first communications device further includes a third service board, and the third service board includes a third processor and a third component, where the third processor is used for service processing, and the third component includes a processor and/or a programmable logic device, the method may further include: receiving, by the second component, a second signal (the second signal may be, for example, an interrupt signal or another type of signal) from the third component, updating the current total number of abnormal ports of the second communications device based on the number, which is indicated by the second signal, of abnormal ports of the second communications device, and if the updated current total number of abnormal ports of the second communications device satisfies the failure confirmation condition corresponding to the second communications device, informing the second processor that the second communications device partially or entirely fails, where the second signal is sent by the third component after the third component receives a port abnormality interrupt signal initiated by N2 ports of the third service board, the second signal indicates that N2 ports of the second communications device are abnormal, and the N2 ports are some ports in the M ports. In this way, aggregation and processing of multiple single-point link failures are implemented to some degree, which helps improve reliability of fault detection.

Figure 1C:
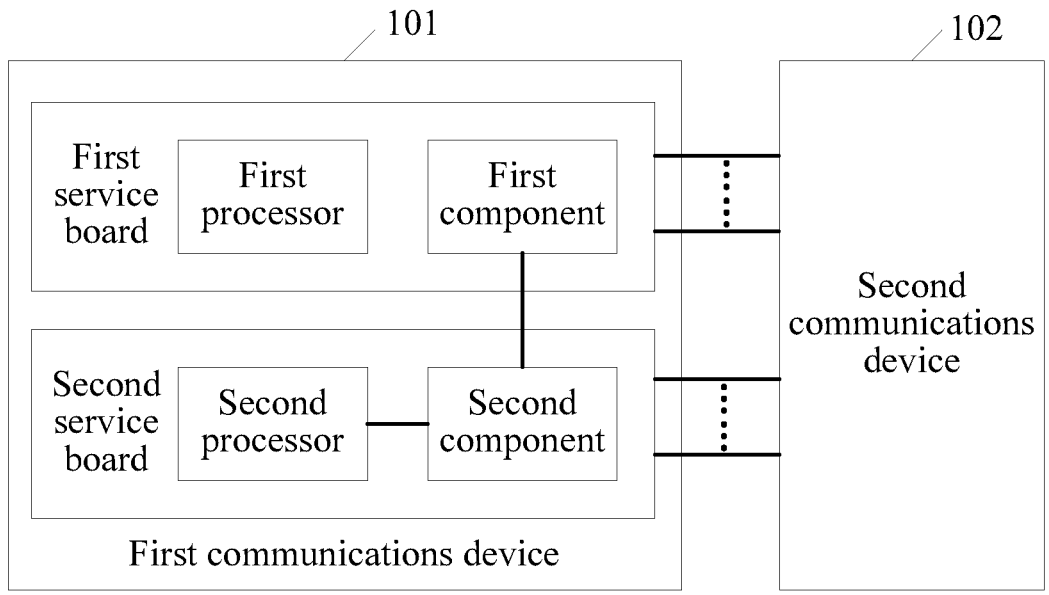
FIG. 1C is a schematic architecture diagram of another stack system according to an embodiment of the present invention.

For example, as shown in FIG. 1C, in some embodiments of the present invention, if there are also interconnect ports between the second service board and the second communications device, the method may further include: receiving, by the second component, a port abnormality interrupt signal initiated by N3 ports of the second service board, where the N3 ports are some ports in the M ports, updating the current total number of abnormal ports of the second communications device based on N3, and if the updated current total number of abnormal ports of the second communications device satisfies the failure confirmation condition corresponding to the second communications device, informing the second processor that the second communications device partially or entirely fails. In this way, aggregation and processing of multiple single-point link failures are implemented to some degree, which helps improve reliability of fault detection.

In some embodiments of the present invention, if the updated current total number of abnormal ports of the second communications device satisfies a failure confirmation condition corresponding to the second communications device, informing the second processor that the second communications device partially or entirely fails may include: if the updated current total number of abnormal ports of the second communications device is equal to M, informing the second processor that the second communications device entirely fails; or if the updated current total number of abnormal ports of the second communications device is greater than or equal to M−X1, informing the second processor that the second communications device partially or entirely fails, where X1 is less than M; or if the updated current total number of abnormal ports of the second communications device is greater than or equal to X2%*M, informing the second processor that the second communications device partially or entirely fails, where X2 is greater than 0 and is less than or equal to 100.

Figure 1D:
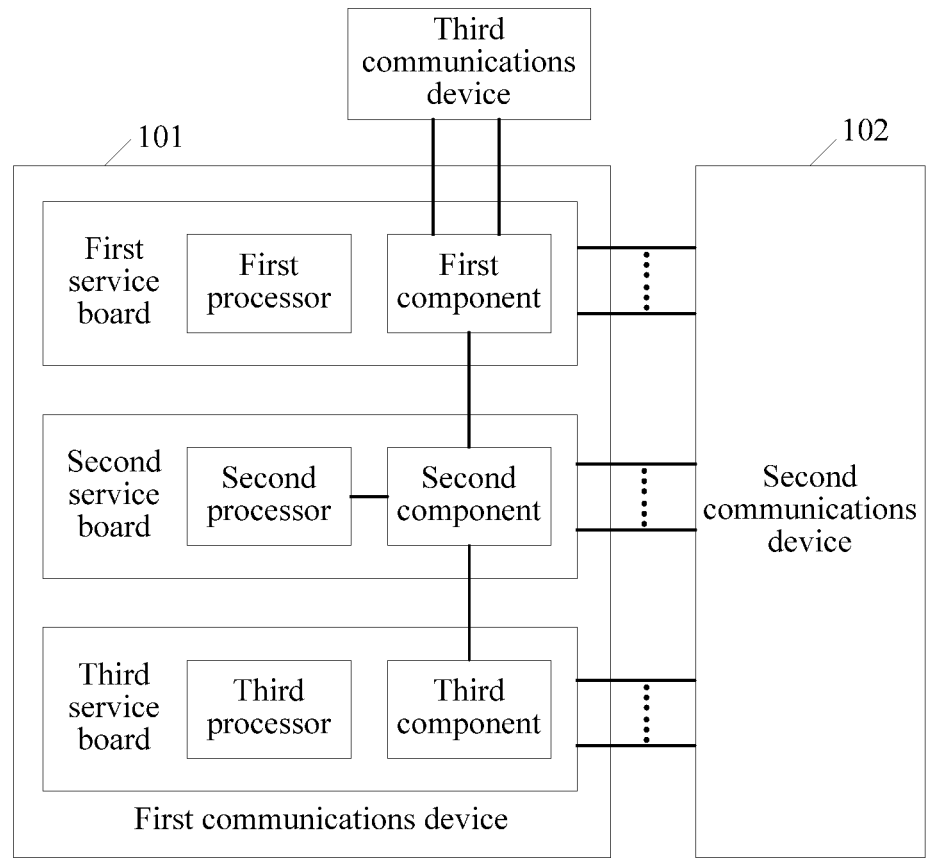
FIG. 1D is a schematic architecture diagram of another stack system according to an embodiment of the present invention.

For example, as shown in FIG. 1D, in some embodiments of the present invention, if the stack system further includes a third communications device, where the first communications device and the third communications device are interconnected using Y ports, the fault detection method may further include: receiving, by the second component, a fourth signal from the first component, updating the current total number of abnormal ports of the third communications device based on the number, which is indicated by the fourth signal, of abnormal ports of the third communications device, and if the updated current total number of abnormal ports of the third communications device satisfies a failure confirmation condition corresponding to the third communications device, informing the second processor that the third communications device partially or entirely fails, where the fourth signal is sent by the first component after the first component receives a port abnormality interrupt signal initiated by W1 ports of the first service board, the fourth signal indicates that W1 ports of the third communications device are abnormal, and the W1 ports are a part or all of ports in the Y ports.

In some embodiments of the present invention, if the updated current total number of abnormal ports of the third communications device satisfies a failure confirmation condition corresponding to the third communications device, informing the second processor that the third communications device partially or entirely fails may include: if the updated current total number of abnormal ports of the third communications device is equal to Y, informing the second processor that the third communications device entirely fails; or if the updated current total number of abnormal ports of the third communications device is greater than or equal to Y−X3, informing the second processor that the third communications device partially or entirely fails, where X3 is less than Y; or if the updated current total number of abnormal ports of the third communications device is greater than or equal to X4%*M, informing the second processor that the third communications device partially or entirely fails, where X4 is greater than 0 and is less than or equal to 100.

It can be understood that in a case in which there are multiple communications devices, each communications device may detect a fault of an adjacent communications device in the foregoing manner, and no extra example is given herein.

As can be seen from the foregoing, in this embodiment, a component (for example, a first component and a second component) used for fault detection is additionally disposed on a service board in a communications device in a stack system, where the component may include a processor and/or a programmable logic device. Port fault detection is performed using the dedicated component, for example, when receiving a first signal from the first component, the second component updates the current total number of abnormal ports of a second communications device based on the number, which is indicated by the first signal, of abnormal ports of the second communications device; and if the updated current total number of abnormal ports of the second communications device satisfies a failure confirmation condition corresponding to the second communications device, the second component may inform a second processor that the second communications device partially or entirely fails. Because fault detection and normal service processing work of the service board are separated, capability of a processor (for example, a first processor and the second processor) responsible for service processing on the service board is released, and fault detection is performed using dedicated hardware, which helps improve efficiency and reliability of fault detection.

For ease of better understanding, the following provides descriptions using two specific scenarios as examples.

Figure 3A:
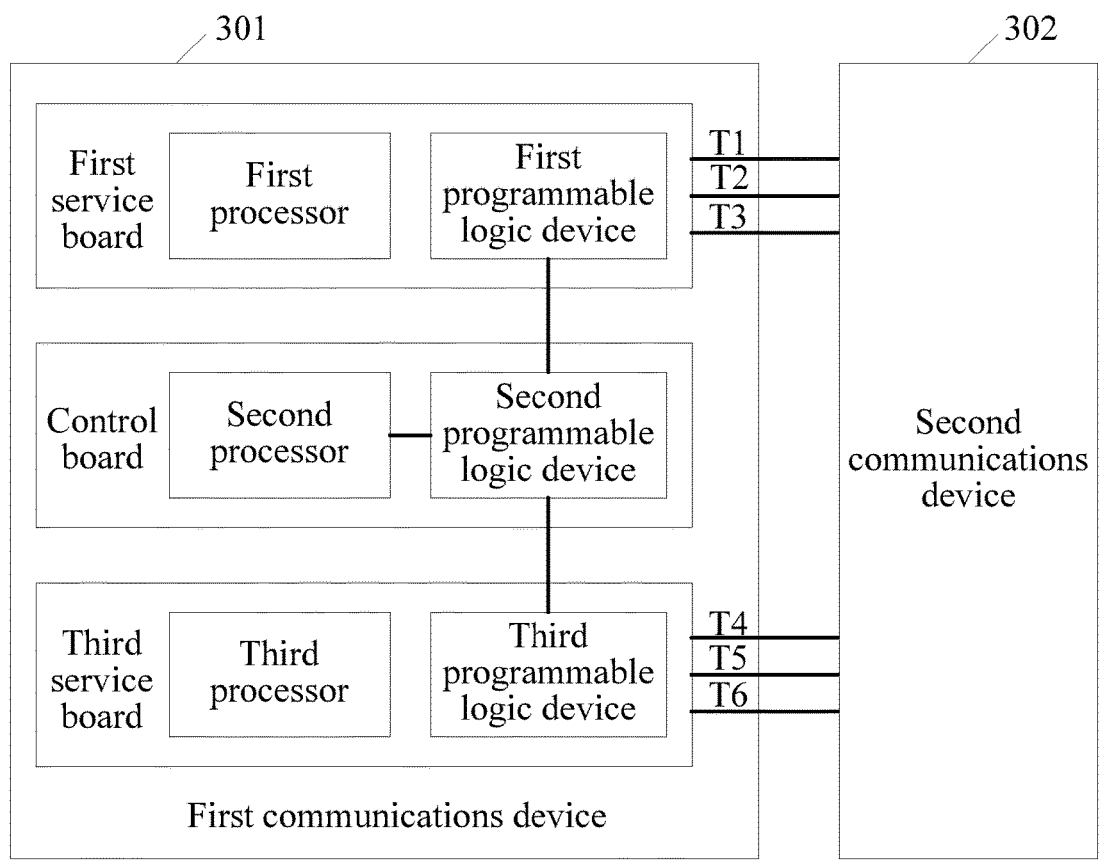
FIG. 3A is a schematic architecture diagram of another stack system according to an embodiment of the present invention.

Referring to FIG. 3A, FIG. 3A is a schematic architecture diagram of another stack system according to an embodiment of the present invention. The stack system shown in FIG. 3A includes a first communications device 301 and a second communications device 302, where the first communications device 301 may include a first service board, a control board, and a third service board. The first service board may include a first processor and a first programmable logic device, the control board may include a second processor and a second programmable logic device, and the third service board may include a third processor and a third programmable logic device. The first processor, the second processor, and the third processor are used for service processing, and the first communications device 301 and the second communications device 302 are interconnected using 6 ports (T1 to T6).

In a possible application scenario, it is assumed that when the first programmable logic device receives a port abnormality interrupt signal initiated by 3 ports (T1 to T3) of the first service board, the first programmable logic device may send a first interrupt signal to the second programmable logic device, where the first interrupt signal indicates that the number of abnormal ports of the second communications device is 3. After receiving the first interrupt signal from the first programmable logic device, the second programmable logic device updates the current total number of abnormal ports of the second communications device to 3 (0+3=3) based on the number, which is indicated by the first interrupt signal, of the abnormal ports of the second communications device. The second programmable logic device determines that the updated current total number of abnormal ports of the second communications device is still less than 6, and therefore a failure confirmation condition corresponding to the second communications device is not satisfied for the moment. Therefore, at the moment, the second programmable logic device does not inform the second processor that the second communications device entirely fails. Subsequently, it is assumed that after the third programmable logic device receives a port abnormality interrupt signal initiated by 3 ports (T4 to T6) of the third service board, the third programmable logic device may send a second interrupt signal to the second programmable logic device, where the second interrupt signal indicates that the number of abnormal ports of the second communications device is 3. After receiving the second interrupt signal from the third programmable logic device, the second programmable logic device updates the current total number of abnormal ports of the second communications device to 6 (3+3=6) based on the number, which is indicated by the second interrupt signal, of abnormal ports of the second communications device. The second programmable logic device determines that the updated current total number of abnormal ports of the second communications device is equal to 6, and therefore, the failure confirmation condition corresponding to the second communications device is satisfied. The second programmable logic device sends an interrupt signal to the second processor, so as to inform the second processor that the second communications device entirely fails.

In another possible application scenario, it is assumed that when the current total number of abnormal ports of the second communications device is less than 4, that the second communications device fails is not reported; when the current total number of abnormal ports of the second communications device is greater than or equal to 4 and is less than 6, it may be reported that the second communications device partially fails; when the current total number of abnormal ports of the second communications device is equal to 6, it may be reported that the second communications device entirely fails.

It is assumed that when the first programmable logic device receives a port abnormality interrupt signal initiated by 2 ports (T1 to T2) of the first service board, the first programmable logic device may send a first interrupt signal to the second programmable logic device, where the first interrupt signal indicates that the number of abnormal ports of the second communications device is 2. After receiving the first interrupt signal from the first programmable logic device, the second programmable logic device updates the current total number of abnormal ports of the second communications device to 2 (0+2=2) based on the number, which is indicated by the first interrupt signal, of abnormal ports of the second communications device. The second programmable logic device determines that the updated current total number of abnormal ports of the second communications device is less than 4 or 6, and therefore, a failure confirmation condition corresponding to the second communications device is not satisfied for the moment. Therefore, at the moment, the second programmable logic device does not inform the second processor that the second communications device partially or entirely fails. Subsequently, it is assumed that after the third programmable logic device receives a port abnormality interrupt signal initiated by 3 ports (T4 to T6) of the third service board, the third programmable logic device may send a second interrupt signal to the second programmable logic device, where the second interrupt signal indicates that the number of abnormal ports of the second communications device is 3. After receiving the second interrupt signal from the third programmable logic device, the second programmable logic device updates the current total number of abnormal ports of the second communications device to 5 (2+3=5) based on the number, which is indicated by the second interrupt signal, of abnormal ports of the second communications device. The second programmable logic device determines that the updated current total number of abnormal ports of the second communications device is greater than 4 and less than 6, and therefore, the failure confirmation condition corresponding to the second communications device is satisfied. The second programmable logic device sends an interrupt signal to the second processor, so as to inform the second processor that the second communications device partially fails, where an interrupt signal for informing the second processor of entire failure may be different from an interrupt signal for informing the second processor of partial failure.

Figure 3B:
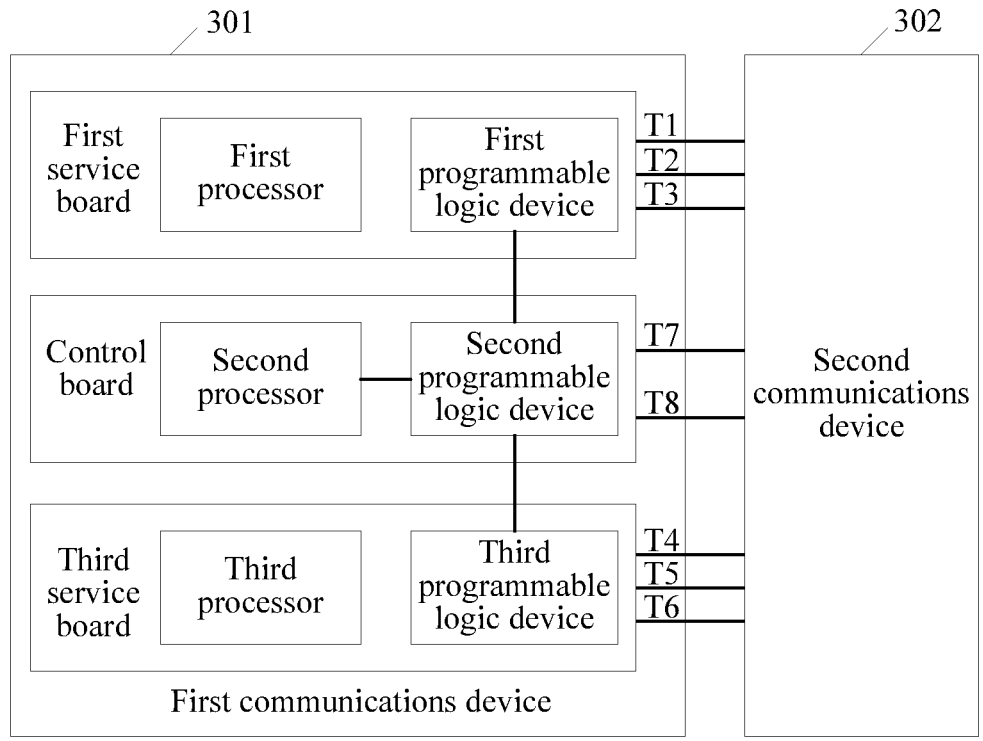
FIG. 3B is a schematic architecture diagram of another stack system according to an embodiment of the present invention.

Referring to FIG. 3B, FIG. 3B is a schematic architecture diagram of another stack system according to an embodiment of the present invention. The stack system shown in FIG. 3B includes a first communications device 301 and a second communications device 302, where the first communications device 301 may include a first service board, a control board, and a third service board. The first service board may include a first processor and a first programmable logic device, the control board may include a second processor and a second programmable logic device, and the third service board may include a third processor and a third programmable logic device. The first processor, the second processor, and the third processor are used for service processing, and the first communications device 301 and the second communications device 302 are interconnected using 8 ports (T1 to T8).

In a possible application scenario, it is assumed that when the first programmable logic device receives a port abnormality interrupt signal initiated by 3 ports (T1 to T3) of the first service board, the first programmable logic device may send a first interrupt signal to the second programmable logic device, where the first interrupt signal indicates that the number of abnormal ports of the second communications device is 3. After receiving the first interrupt signal from the first programmable logic device, the second programmable logic device updates the current total number of abnormal ports of the second communications device to 3 (0+3=3) based on the number, which is indicated by the first interrupt signal, of abnormal ports of the second communications device. The second programmable logic device determines that the updated current total number of abnormal ports of the second communications device is still less than 8, and therefore, a failure confirmation condition corresponding to the second communications device is not satisfied for the moment. Therefore, at the moment, the second programmable logic device does not inform the second processor that the second communications device entirely fails. Subsequently, it is assumed that after the third programmable logic device receives a port abnormality interrupt signal initiated by 3 ports (T4 to T6) of the third service board, the third programmable logic device may send a second interrupt signal to the second programmable logic device, where the second interrupt signal indicates that the number of abnormal ports of the second communications device is 3. After receiving the second interrupt signal from the third programmable logic device, the second programmable logic device updates the current total number of abnormal ports of the second communications device to 6 (3+3=6) based on the number, which is indicated by the second interrupt signal, of abnormal ports of the second communications device. The second programmable logic device determines that the updated current total number of abnormal ports of the second communications device is still less than 8, and therefore, the failure confirmation condition corresponding to the second communications device is not satisfied for the moment. Therefore, at the moment, the second programmable logic device does not inform the second processor that the second communications device entirely fails. Subsequently, the second programmable logic device receives a port abnormality interrupt signal initiated by 2 ports (T4 to T6) of the control board, and the second programmable logic device updates the current total number of abnormal ports of the second communications device to 8 (3+3+2=8), and therefore, the failure confirmation condition corresponding to the second communications device is satisfied. The second programmable logic device sends an interrupt signal to the second processor, so as to inform the second processor that the second communications device entirely fails.

In another possible application scenario, it is assumed that when the current total number of abnormal ports of the second communications device is less than 5, that the second communications device fails is not reported; when the current total number of abnormal ports of the second communications device is greater than or equal to 5 and is less than 8, it may be reported that the second communications device partially fails; when the current total number of abnormal ports of the second communications device is equal to 8, it may be reported that the second communications device entirely fails.

It is assumed that when the first programmable logic device receives a port abnormality interrupt signal initiated by 3 ports (T1 to T2) of the first service board, the first programmable logic device may send a first interrupt signal to the second programmable logic device, where the first interrupt signal indicates that the number of abnormal ports of the second communications device is 3. After receiving the first interrupt signal from the first programmable logic device, the second programmable logic device updates the current total number of abnormal ports of the second communications device to 3 (0+3=3) based on the number, which is indicated by the first interrupt signal, of abnormal ports of the second communications device. The second programmable logic device determines that the updated current total number of abnormal ports of the second communications device is less than 5 or 8, and therefore, a failure confirmation condition corresponding to the second communications device is not satisfied for the moment. Therefore, at the moment, the second programmable logic device does not inform the second processor that the second communications device partially or entirely fails. Subsequently, it is assumed that after the third programmable logic device receives a port abnormality interrupt signal initiated by 3 ports (T4 to T6) of the third service board, the third programmable logic device may send a second interrupt signal to the second programmable logic device, where the second interrupt signal indicates that the number of abnormal ports of the second communications device is 3. After receiving the second interrupt signal from the third programmable logic device, the second programmable logic device updates the current total number of abnormal ports of the second communications device to 6 (3+3=6) based on the number, which is indicated by the second interrupt signal, of abnormal ports of the second communications device. The second programmable logic device determines that the updated current total number of abnormal ports of the second communications device is equal to 6 (that is, greater than 5 and less than 8), and therefore, a partial failure confirmation condition of the second communications device is satisfied. The second programmable logic device sends an interrupt signal to the second processor, so as to inform the second processor that the second communications device partially fails. Subsequently, the second programmable logic device further receives a port abnormality interrupt signal initiated by 2 ports (T4 to T6) of the control board, and the second programmable logic device updates the current total number of abnormal ports of the second communications device to 8 (3+3+2=8), and therefore, an entire failure confirmation condition corresponding to the second communications device is satisfied. The second programmable logic device sends an interrupt signal to the second processor, so as to inform the second processor that the second communications device entirely fails, where the interrupt signal for informing the second processor of entire failure may be different from the interrupt signal for informing the second processor of partial failure.

It can be seen that, in the foregoing two examples, port fault detection is performed using dedicated hardware (for example, a first programmable logic device, a second programmable logic device, and a third programmable logic device). For example, when receiving a first interrupt signal from a first component, the second programmable logic device updates the current total number of abnormal ports of a second communications device based on the number, which is indicated by the first interrupt signal, of abnormal ports of the second communications device; and if the updated current total number of abnormal ports of the second communications device satisfies a failure confirmation condition corresponding to the second communications device, the second programmable logic device may inform a second processor that the second communications device partially or entirely fails. Because fault detection and normal service processing work of the service board are separated, capability of a processor (for example, a first processor and the second processor) responsible for service processing on the service board is released, and fault detection is performed using dedicated hardware, which helps improve efficiency and reliability of fault detection.

It can be understood that the foregoing scenarios are merely examples, and in an actual application, adaptive changes may be made according to different scenarios and actual requirements.

To facilitate better implementation of the foregoing solution of the embodiment of the present invention, the following further provides a related apparatus used for implementing the foregoing solution.

Figure 4A:
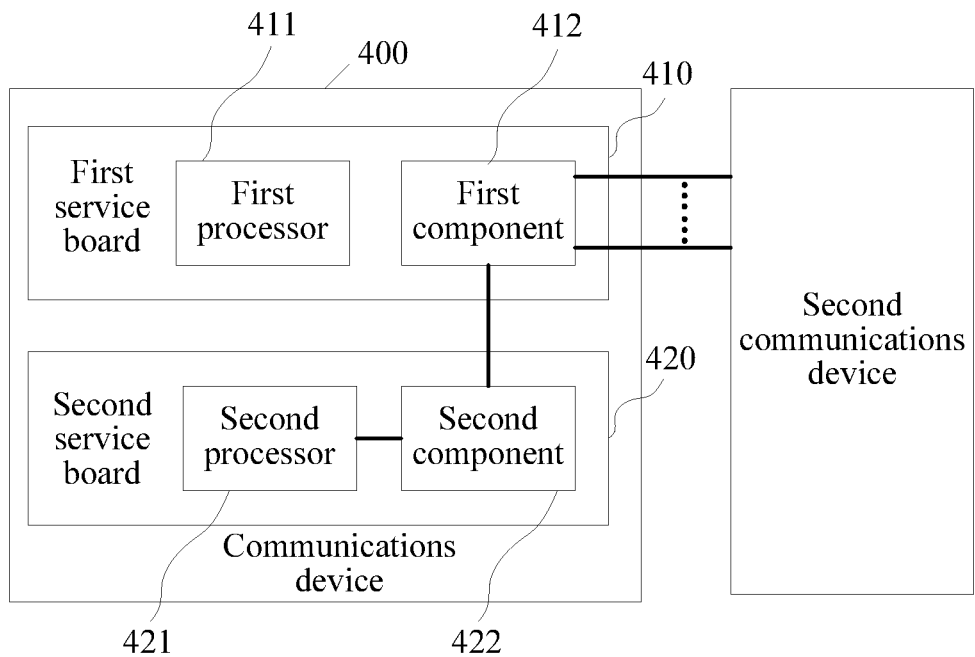
FIG. 4A is a schematic diagram of a communications device according to an embodiment of the present invention.

Referring to FIG. 4A, a communications device 400 provided by an embodiment of the present invention may include a first service board 410 and a second service board 420, where the first service board 410 includes a first processor 411 and a first component 412, and the second service board 420 includes a second processor 421 and a second component 422, where the first processor 411 and the second processor 421 are used for service processing, the first component 412 includes a processor and/or a programmable logic device, and the second component 422 includes a processor and/or a programmable logic device; the communications device 400 may be interconnected with a second communications device using M ports.

The second component 422 is configured to receive a first signal from the first component 412, update the current total number of abnormal ports of the second communications device based on the number, which is indicated by the first signal, of abnormal ports of the second communications device, and if the updated current total number of abnormal ports of the second communications device satisfies a failure confirmation condition corresponding to the second communications device, inform the second processor 421 that the second communications device partially or entirely fails, where the first signal is sent by the first component 412 after the first component 412 receives a port abnormality interrupt signal initiated by N1 ports of the first service board, the first signal indicates that N1 ports of the second communications device are abnormal, and the N1 ports are a part or all of ports in the M ports.

Figure 4B:
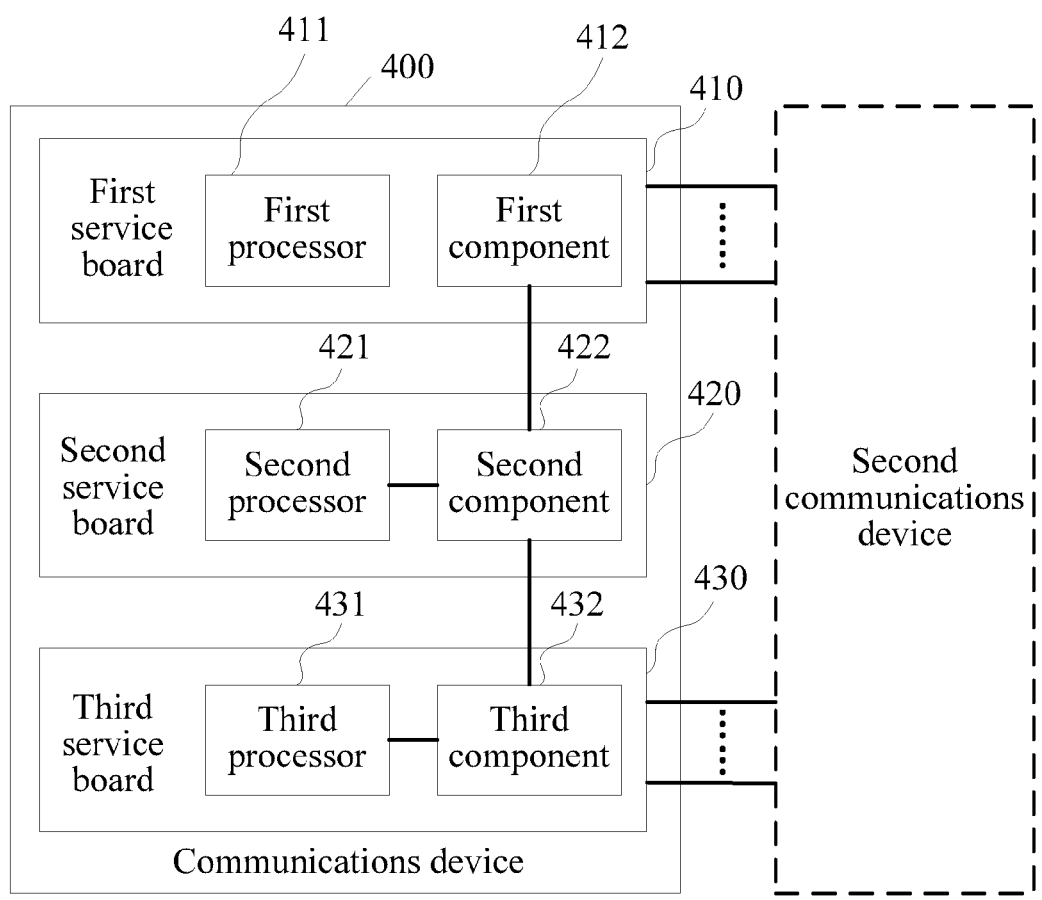
FIG. 4B is a schematic diagram of another communications device according to an embodiment of the present invention.

Referring to FIG. 4B, in some embodiments of the present invention, the communications device 400 may further include a third service board 430, and the third service board 430 includes a third processor 431 and a third component 432, where the third processor 430 is used for service processing, and the third component 432 includes a processor and/or a programmable logic device.

The second component 422 is further configured to receive a second signal from the third component 432, update the current total number of abnormal ports of the second communications device based on the number, which is indicated by the second signal, of abnormal ports of the second communications device, and if the updated current total number of abnormal ports of the second communications device satisfies the failure confirmation condition corresponding to the second communications device, inform the second processor 421 that the second communications device partially or entirely fails, where the second signal is sent by the third component 432 after the third component 432 receives a port abnormality interrupt signal initiated by N2 ports of the third service board, the second signal indicates that N2 ports of the second communications device are abnormal, and the N2 ports are some ports in the M ports.

Figure 4C:
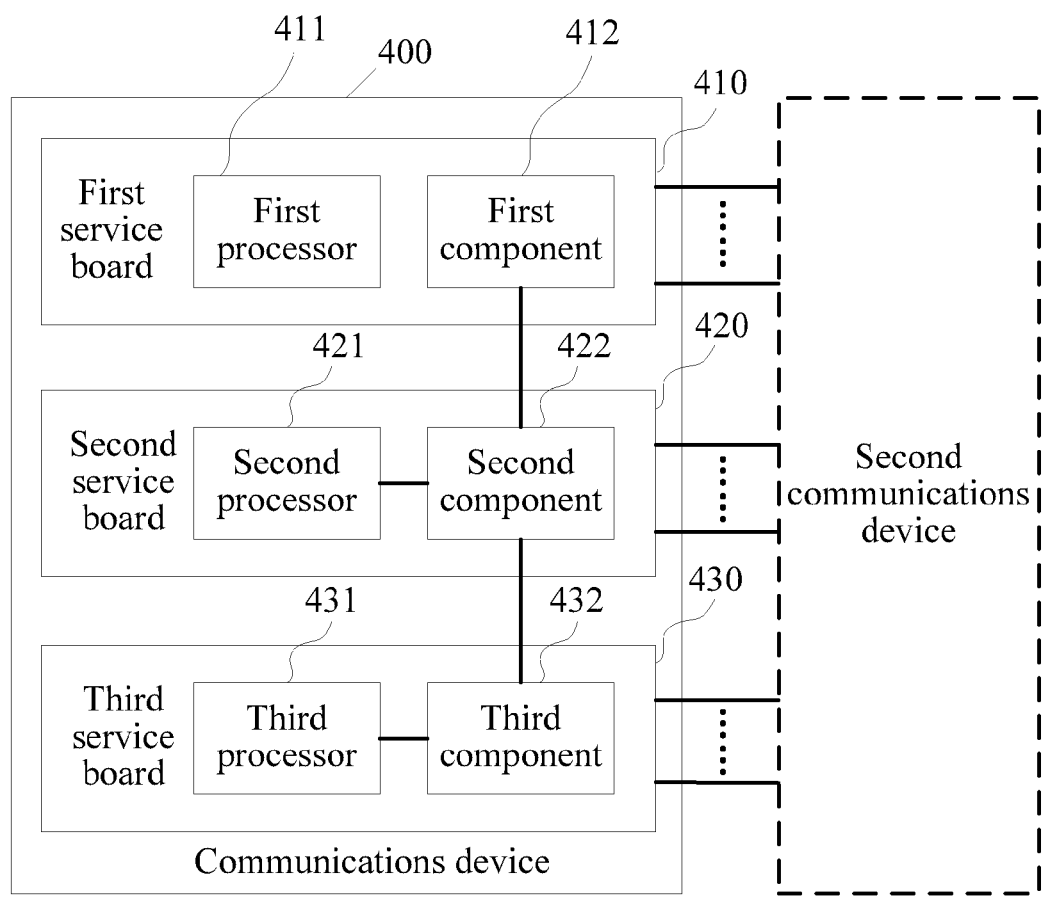
FIG. 4C is a schematic diagram of another communications device according to an embodiment of the present invention.

Referring to FIG. 4C, in some embodiments of the present invention, the second component 422 is further configured to receive a port abnormality interrupt signal initiated by N3 ports of the second service board, where the N3 ports are some ports in the M ports, update the current total number of abnormal ports of the second communications device based on N3, and if the updated current total number of abnormal ports of the second communications device satisfies the failure confirmation condition corresponding to the second communications device, inform the second processor 421 that the second communications device partially or entirely fails.

Figure 4D:
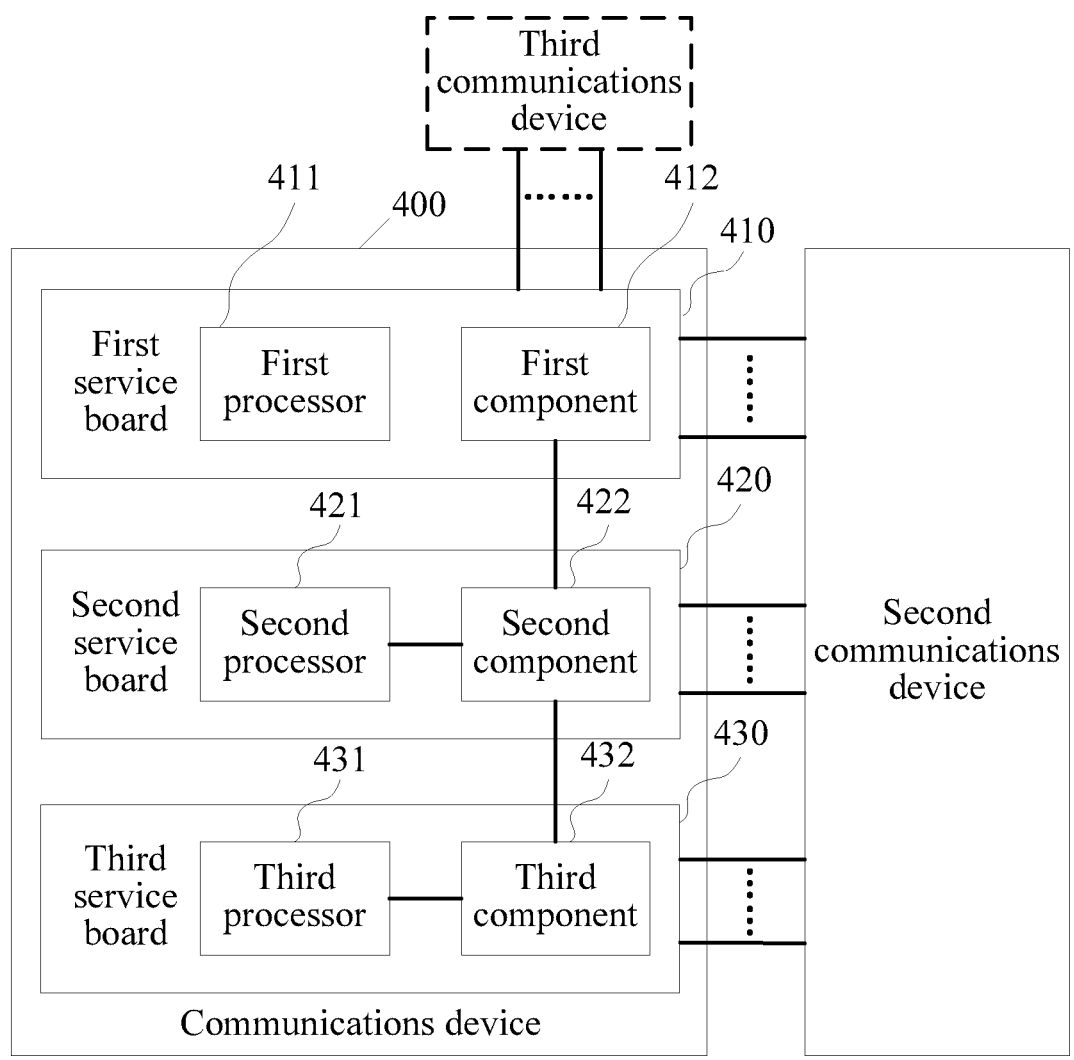
FIG. 4D is a schematic diagram of another communications device according to an embodiment of the present invention.

Referring to FIG. 4D, in some embodiments of the present invention, the communications device 400 may be further interconnected with a third communications device using Y ports; and the second component 421 may be further configured to receive a fourth signal from the first component 412, update the current total number of abnormal ports of the third communications device based on the number, which is indicated by the fourth signal, of abnormal ports of the third communications device, and if the updated current total number of abnormal ports of the third communications device satisfies a failure confirmation condition corresponding to the third communications device, inform the second processor that the third communications device partially or entirely fails, where the fourth signal is sent by the first component after the first component receives a port abnormality interrupt signal initiated by W1 ports of the first service board, the fourth signal indicates that W1 ports of the third communications device are abnormal, and the W1 ports are a part or all of ports in the Y ports.

Each communications device in this embodiment may be, for example, a server, a router, a switch, or another network device.

It can be understood that functions of functional modules of the communications device 400 in this embodiment may be specifically implemented according to the method in the foregoing method embodiment, and for a specific implementation process, reference may be made to related descriptions in the foregoing method embodiment, and details are not repeatedly described herein.

As can be seen from the foregoing, in this embodiment, a component (for example, a first component and a second component) used for fault detection is additionally disposed on a service board in a communications device 400, where the component may include a processor and/or a programmable logic device. Port fault detection is performed using the dedicated component, for example, when receiving a first signal from the first component, the second component updates the current total number of abnormal ports of a second communications device based on the number, which is indicated by the first signal, of abnormal ports of the second communications device; and if the updated current total number of abnormal ports of the second communications device satisfies a failure confirmation condition corresponding to the second communications device, the second component may inform a second processor that the second communications device partially or entirely fails. Because fault detection and normal service processing work of the service board are separated, capability of a processor (for example, a first processor and the second processor) responsible for service processing on the service board is released, and fault detection is performed using the dedicated component, which helps improve efficiency and reliability of fault detection.

An embodiment of the present invention further provides a stack system, where multiple interconnected communications devices, and at least one of the multiple communications devices is the communications device 400.

An embodiment of the present invention further provides a computer storage medium, where the computer storage medium may store a program, and when executed, the program includes a part or all of the steps of the fault monitoring method described in the foregoing method embodiment.

It should be noted that, for ease of description, the foregoing method embodiments are described as a combination of a series of actions. However, a person skilled in the art should understand that the present invention is not limited by the order of the described actions, because according to the present invention, some steps may be performed in another order or simultaneously. In addition, it should be further understood by a person skilled in the art that the described embodiments all belong to exemplary embodiments, and the involved actions and modules are not necessarily required by the present invention.

In the foregoing embodiments, the description of each embodiment has respective focuses. For a part that is not described in detail in a certain embodiment, reference may be made to related descriptions in other embodiments.

In the several embodiments provided in the present application, it should be understood that the disclosed apparatus may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to an actual need to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, a network device, or the like) to perform all or a part of the steps of the methods described in the embodiments of the present invention. The foregoing storage medium includes a medium that can store program code, such as a universal serial bus (USB) flash drive, a read-only memory (ROM), a random access memory (RAM), a removable hard disk, a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A fault detection method, applied in a stack system, wherein the stack system comprises a first communications device and a second communications device, wherein the first communications device comprises a first service board and a second service board, wherein the first service board comprises a first processor and a first component, wherein the second service board comprises a second processor and a second component, wherein the first processor and the second processor are used for service processing, wherein the first communications device and the second communications device are interconnected using M ports, and wherein the fault detection method comprises:
   receiving, by the second component, a first signal from the first component;
   updating the current total number of abnormal ports of the second communications device based on the number of abnormal ports of the second communications device, wherein the number of abnormal ports of the second communication device is indicated by the first signal; and
   informing the second processor that the second communications device partially or entirely fails when the updated current total number of abnormal ports of the second communications device satisfies a failure confirmation condition corresponding to the second communications device,
   wherein the first signal is sent by the first component after the first component receives a port abnormality interrupt signal initiated by N1 ports of the first service board,
   wherein the first signal indicates that N1 ports of the second communications device are abnormal, and
   wherein the N1 ports are a part or all of ports in the M ports.

2. The method according to claim 1, wherein the first communications device further comprises a third service board, wherein the third service board comprises a third processor and a third component, wherein the third processor is used for service processing, wherein the method further comprises:
   receiving, by the second component, a second signal from the third component;
   updating the current total number of abnormal ports of the second communications device based on the number of abnormal ports of the second communications device, wherein the number of abnormal ports of the second communication device is indicated by the second signal; and
   informing the second processor that the second communications device partially or entirely fails when the updated current total number of abnormal ports of the second communications device satisfies the failure confirmation condition corresponding to the second communications device,
   wherein the second signal is sent by the third component after the third component receives a port abnormality interrupt signal initiated by N2 ports of the third service board,
   wherein the second signal indicates that N2 ports of the second communications device are abnormal, and
   wherein the N2 ports are some ports in the M ports.

3. The method according to claim 1, wherein the method further comprises:
   receiving, by the second component, a port abnormality interrupt signal initiated by N3 ports of the second service board, wherein the N3 ports are some ports in the M ports;
   updating the current total number of abnormal ports of the second communications device based on N3; and
   informing the second processor that the second communications device partially or entirely fails when the updated current total number of abnormal ports of the second communications device satisfies the failure confirmation condition corresponding to the second communications device.

4. The method according to claim 1, wherein informing the second processor that the second communications device partially or entirely fails comprises informing the second processor that the second communications device entirely fails when the updated current total number of abnormal ports of the second communications device is equal to M.

5. The method according to claim 1, wherein informing the second processor that the second communications device partially or entirely fails comprises informing the second processor that the second communications device partially or entirely fails when the updated current total number of abnormal ports of the second communications device is greater than or equal to M−X1, and wherein X1 is less than M.

6. The method according to claim 1, wherein informing the second processor that the second communications device partially or entirely fails comprises informing the second processor that the second communications device partially or entirely fails when the updated current total number of abnormal ports of the second communications device is greater than or equal to X2%*M, and wherein X2 is greater than 0 and is less than or equal to 100.

7. The method according to claim 1, wherein the stack system further comprises a third communications device, wherein the first communications device and the third communications device are interconnected using Y ports, wherein the fault detection method further comprises:
   receiving, by the second component, a fourth signal from the first component;
   updating the current total number of abnormal ports of the third communications device based on the number of abnormal ports of the third communications device, wherein the number of abnormal ports in the third communications device is indicated by the fourth signal; and
   informing the second processor that the third communications device partially or entirely fails when the updated current total number of abnormal ports of the third communications device satisfies a failure confirmation condition corresponding to the third communications device, wherein the fourth signal is sent by the first component after the first component receives a port abnormality interrupt signal initiated by W1 ports of the first service board, wherein the fourth signal indicates that W1 ports of the third communications device are abnormal, and wherein the W1 ports are a part or all of ports in the Y ports.

8. A communications device, wherein the communications device is interconnected with a second communications device using M ports, wherein the communications device comprises:

a first service board comprising a first processor and a first component;

a second service board comprising a second processor and a second component, wherein the first processor and the second processor are used for service processing, wherein the second component is configured to:
receive a first signal from the first component;
update the current total number of abnormal ports of the second communications device based on the number of abnormal ports of the second communications device, wherein the number of abnormal ports of the second communications device is indicated by the first signal; and
inform the second processor that the second communications device partially or entirely fails when the updated current total number of abnormal ports of the second communications device satisfies a failure confirmation condition corresponding to the second communications device, wherein the first signal is sent by the first component after the first component receives a port abnormality interrupt signal initiated by N1 ports of the first service board, wherein the first signal indicates that N1 ports of the second communications device are abnormal, and wherein the N1 ports are a part or all of ports in the M ports.

9. The communications device according to claim 8, wherein the communications device further comprises a third service board, wherein the third service board comprises a third processor and a third component, wherein the third processor is used for service processing, and wherein the second component is further configured to:

receive a second signal from the third component;
update the current total number of abnormal ports of the second communications device based on the number of abnormal ports of the second communications device, wherein the number of abnormal ports of the second communications device is indicated by the second signal; and
inform the second processor that the second communications device partially or entirely fails when the updated current total number of abnormal ports of the second communications device satisfies the failure confirmation condition corresponding to the second communications device, wherein the second signal is sent by the third component after the third component receives a port abnormality interrupt signal initiated by N2 ports of the third service board, wherein the second signal indicates that N2 ports of the second communications device are abnormal, and wherein the N2 ports are some ports in the M ports.

10. The communications device according to claim 8, wherein the second component is further configured to:

receive a port abnormality interrupt signal initiated by N3 ports of the second service board, wherein the N3 ports are some ports in the M ports;
update the current total number of abnormal ports of the second communications device based on N3; and
inform the second processor that the second communications device partially or entirely fails when the updated current total number of abnormal ports of the second communications device satisfies the failure confirmation condition corresponding to the second communications device.

11. The communications device according to claim 8, wherein the communications device is further interconnected with a third communications device using Y ports, wherein the second component is further configured to:

receive a fourth signal from the first component;
update the current total number of abnormal ports of the third communications device based on the number of abnormal ports of the third communications device, wherein the number of abnormal ports of the third communications device is indicated by the fourth signal; and
inform the second processor that the third communications device partially or entirely fails when the updated current total number of abnormal ports of the third communications device satisfies a failure confirmation condition corresponding to the third communications device, wherein the fourth signal is sent by the first component after the first component receives a port abnormality interrupt signal initiated by W1 ports of the first service board, wherein the fourth signal indicates that W1 ports of the third communications device are abnormal, and wherein the W1 ports are a part or all of ports in the Y ports.

12. A stack system, wherein the stack system comprises:
multiple interconnected communications devices,
wherein at least one of the multiple communications devices is interconnected with a second communications device using M ports, wherein the at least one communications device comprises:

a first service board comprising a first processor and a first component;

a second service board comprising a second processor and a second component, wherein the first processor and the second processor are used for service processing, wherein the second component is configured to:
receive a first signal from the first component;
update the current total number of abnormal ports of the second communications device based on the number of abnormal ports of the second communications device, wherein the number of abnormal ports of the second communications device is indicated by the first signal; and
inform the second processor that the second communications device partially or entirely fails when the updated current total number of abnormal ports of the second communications device satisfies a failure confirmation condition corresponding to the second communications device, wherein the first signal is sent by the first component after the first component receives a port abnormality interrupt signal initiated by N1 ports of the first service board, wherein the first signal indicates that N1 ports of the second communications device are abnormal, and wherein the N1 ports are a part or all of ports in the M ports.

13. The stack system according to claim 12, wherein the at least one communications device further comprises a third service board, wherein the third service board comprises a third processor and a third component, wherein the third processor is used for service processing, and wherein the second component is further configured to:

receive a second signal from the third component;

update the current total number of abnormal ports of the second at least one communications device based on the number of abnormal ports of the second at least one communications device, wherein the number of abnormal ports of the second at least one communications device is indicated by the second signal; and inform the second processor that the second at least one communications device partially or entirely fails when the updated current total number of abnormal ports of the second at least one communications device satisfies the failure confirmation condition corresponding to the second at least one communications device, wherein the second signal is sent by the third component after the third component receives a port abnormality interrupt signal initiated by N2 ports of the third service board, wherein the second signal indicates that N2 ports of the second at least one communications device are abnormal, and wherein the N2 ports are some ports in the M ports.

14. The stack system according to claim 12, wherein the second component is further configured to:

receive a port abnormality interrupt signal initiated by N3 ports of the second service board, wherein the N3 ports are some ports in the M ports;

update the current total number of abnormal ports of the second at least one communications device based on N3; and inform the second processor that the second at least one communications device partially or entirely fails when the updated current total number of abnormal ports of the second at least one communications device satisfies the failure confirmation condition corresponding to the second at least one communications device.

15. The stack system according to claim 12, wherein the at least one communications device is further interconnected with a third at least one communications device using Y ports, wherein the second component is further configured to:

receive a fourth signal from the first component;

update the current total number of abnormal ports of the third at least one communications device based on the number of abnormal ports of the third at least one communications device, wherein the number of abnormal ports of the third at least one communications device is indicated by the fourth signal; and inform the second processor that the third at least one communications device partially or entirely fails when the updated current total number of abnormal ports of the third at least one communications device satisfies a failure confirmation condition corresponding to the third at least one communications device, wherein the fourth signal is sent by the first component after the first component receives a port abnormality interrupt signal initiated by W1 ports of the first service board, wherein the fourth signal indicates that W1 ports of the third at least one communications device are abnormal, and wherein the W1 ports are a part or all of ports in the Y ports.

* * * * *